United States Patent [19]
Lee

[11] Patent Number: 5,768,907
[45] Date of Patent: Jun. 23, 1998

[54] SANITARY PEST CONTROL SYSTEM

[76] Inventor: Frank R. Lee, P.O. Box 14023, Las Vegas, Nev. 89114

[21] Appl. No.: 851,328

[22] Filed: May 5, 1997

[51] Int. Cl.⁶ .............................. F25D 3/00; A01M 1/20
[52] U.S. Cl. ............................................ 62/293; 43/132.1
[58] Field of Search ............................ 62/293, 404, 426, 62/457.9, 262; 43/124, 132.1, 129

[56] References Cited

U.S. PATENT DOCUMENTS

| | | | |
|---|---|---|---|
| 2,290,942 | 7/1942 | Clary et al. | 62/404 |
| 2,566,865 | 9/1951 | Wingerter | 62/457.9 |
| 2,945,360 | 7/1960 | Tyler | 62/457.9 |
| 3,802,216 | 4/1974 | Brandimarte | 62/262 |
| 5,027,546 | 7/1991 | Tallon | 43/124 |
| 5,365,750 | 11/1994 | Greenthal | 62/293 |
| 5,566,627 | 10/1996 | Pryor | 111/118 |

Primary Examiner—William Doerrler

[57] ABSTRACT

A sanitary pest control system including a housing. An air conditioning system is disposed within a hollow interior of the housing. The air conditioning system has a power cord extending outwardly of the housing for coupling with an electrical outlet. A power switch is disposed within a top wall of the housing. The power switch is electrically coupled with the air conditioning system for selective activation or deactivation thereof. A temperature control panel is disposed within a forward wall of the housing and operatively coupled with the power switch and the air conditioning system for adjusting air temperature. An air release nozzle couples with respect to the housing and is in communication with the air conditioning system.

8 Claims, 3 Drawing Sheets

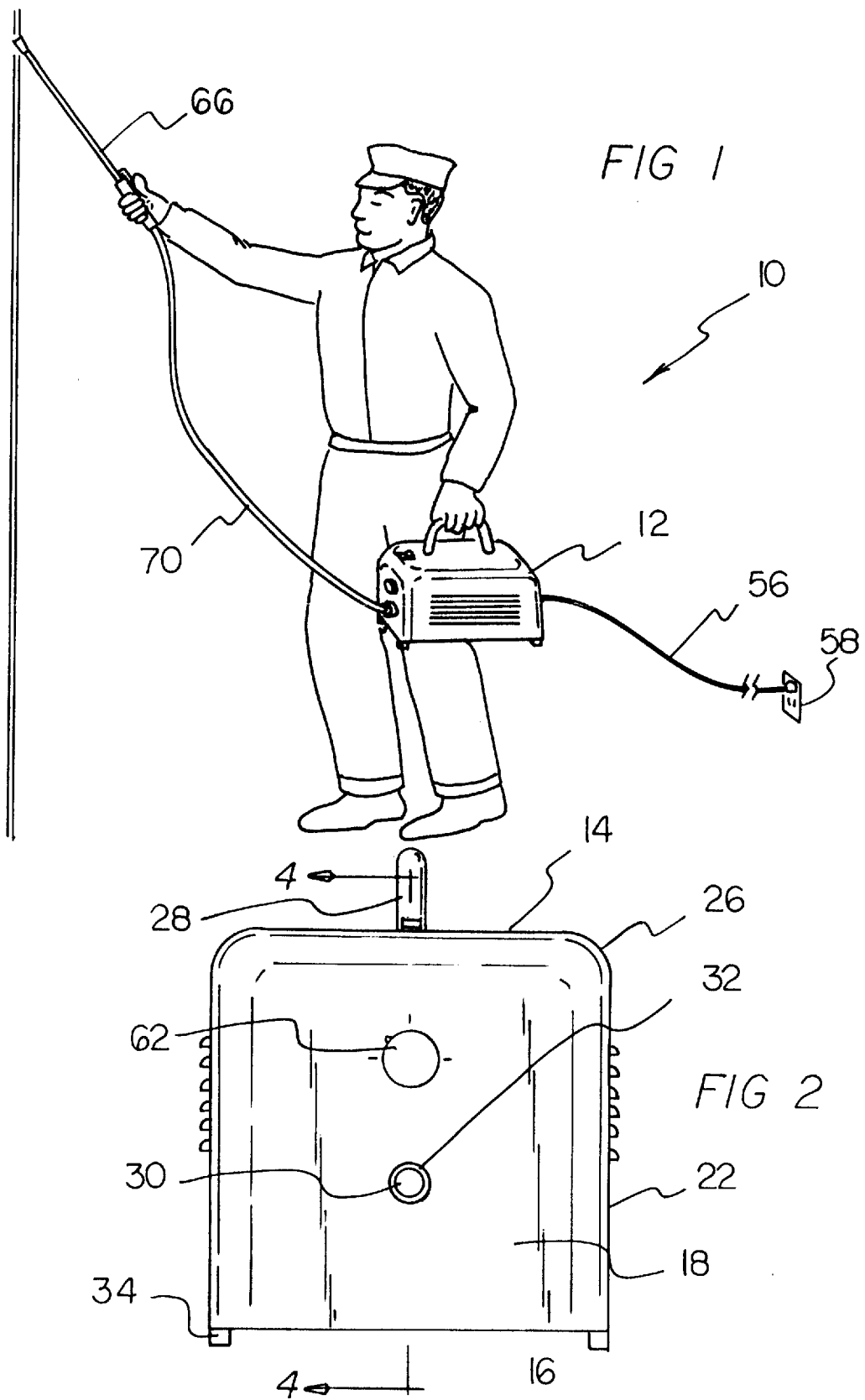

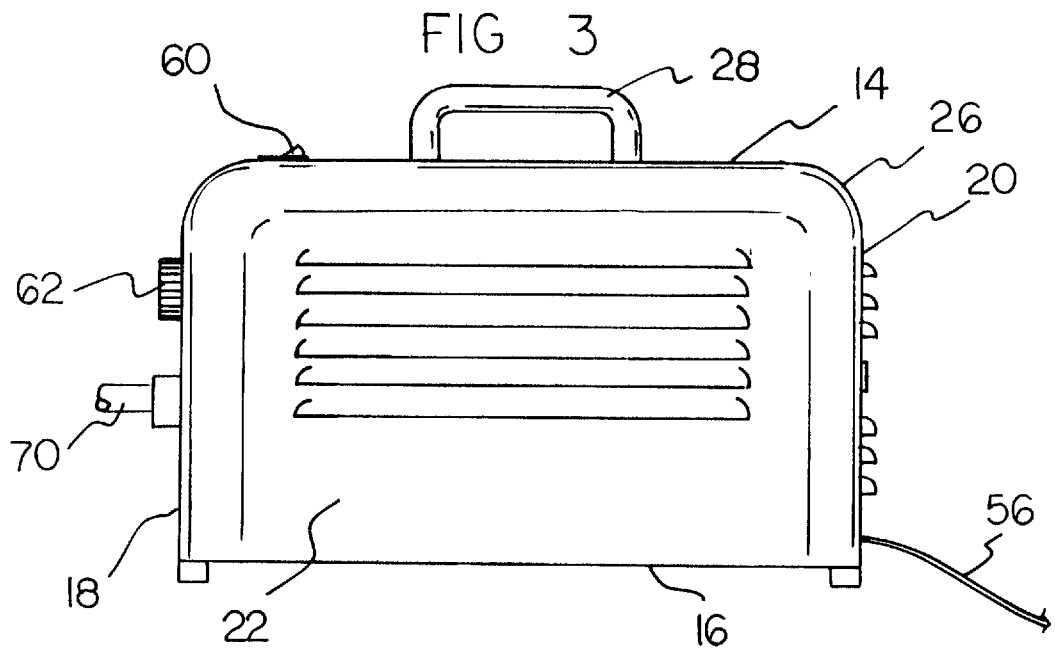
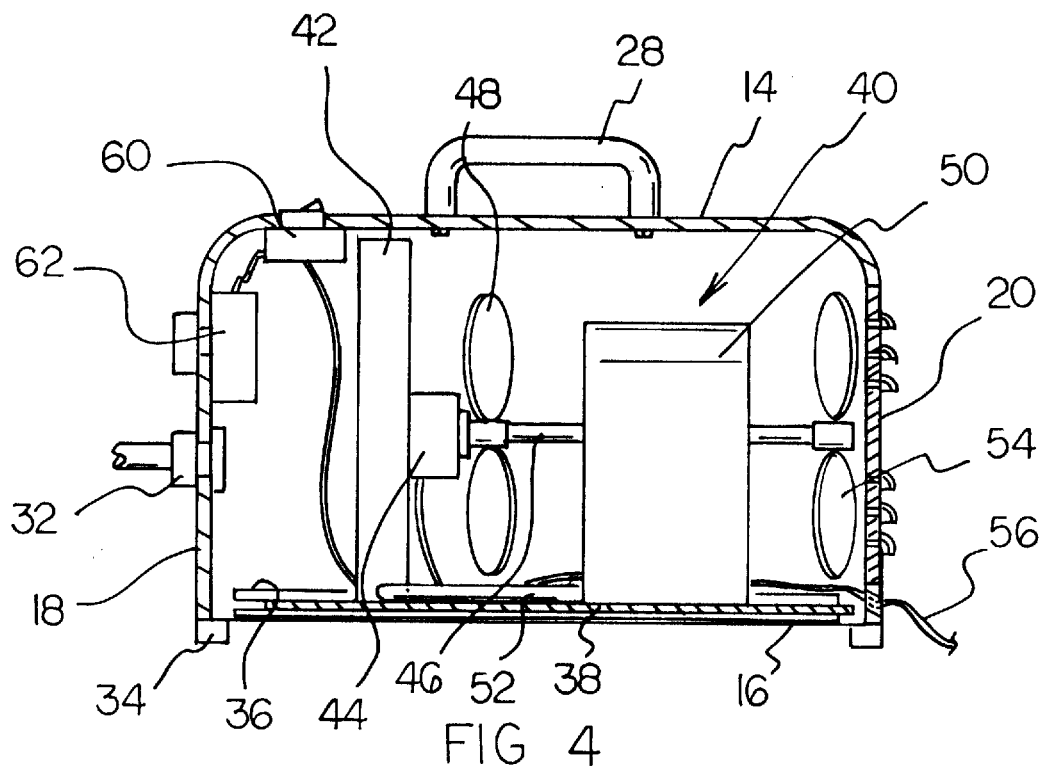

U.S. Patent  Jun. 23, 1998  Sheet 3 of 3  5,768,907
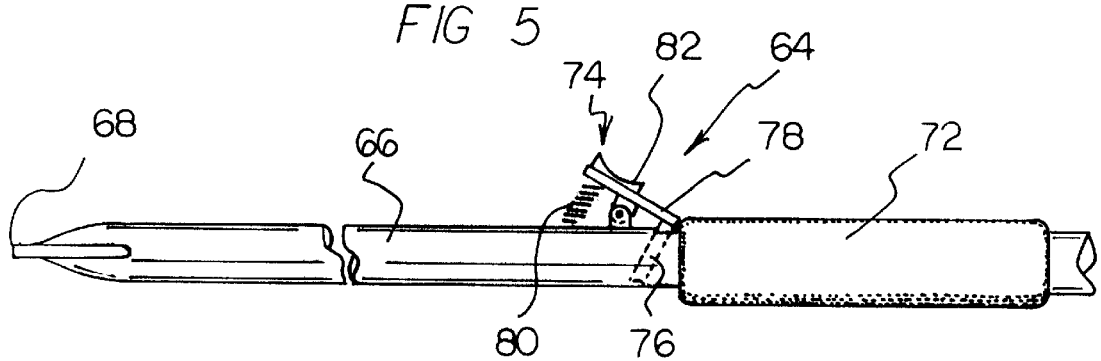
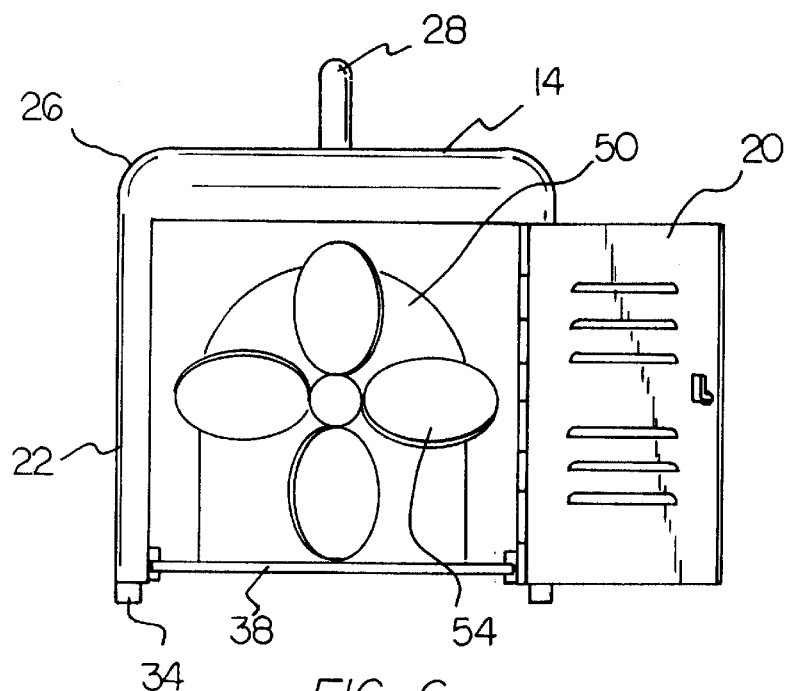

SANITARY PEST CONTROL SYSTEM

BACKGROUND OF THE INVENTION

1. Field of the Invention

The present invention relates to a sanitary pest control system and more particularly pertains to flushing out and killing insects and household pests by freezing them with a sanitary pest control system.

2. Description of the Prior Art

The use of portable air conditioning units is known in the prior art. More specifically, portable air conditioning units heretofore devised and utilized for the purpose of providing cooled air are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,027,546 to Tallon discloses a non-toxic method of exterminating insects. U.S. Pat. No. 2,290,942 to Clary et al. discloses a method and apparatus for eliminating undesired vegetation. U.S. Pat. No. 2,566,865 to Wingerter discloses a portable refrigerator. U.S. Pat. No. 2,749,725 to Essman et al. discloses a portable air conditioning apparatus. U.S. Pat. No. 3,777,506 to Hergatt et al. discloses a portable air conditioner apparatus. U.S. Pat. No. 4,998,414 to Tomimatsu discloses an air conditioning system. U.S. Pat. No. 5,349,778 to Chu discloses a vortex tube for terminating organisms. U.S. Pat. No. 4,817,329 to Forbes discloses extermination of insects by heat. U.S. Pat. No. Des. 342,780 to Pendergrast et al. discloses the ornamental design for a portable air conditioner. U.S. Pat. No. 5,046,329 to Travis, III discloses a portable air conditioning unit.

While these devices fulfill their respective, particular objective and requirements, the aforementioned patents do not describe a sanitary pest control system for flushing out and killing insects and household pests by freezing them.

In this respect, the sanitary pest control system according to the present invention substantially departs from the conventional concepts and designs of the prior art, and in doing so provides an apparatus primarily developed for the purpose of flushing out and killing insects and household pests by freezing them.

Therefore, it can be appreciated that there exists a continuing need for new and improved sanitary pest control system which can be used for flushing out and killing insects and household pests by freezing them. In this regard, the present invention substantially fulfills this need.

SUMMARY OF THE INVENTION

In the view of the foregoing disadvantages inherent in the known types of portable air conditioning units now present in the prior art, the present invention provides an improved sanitary pest control system. As such, the general purpose of the present invention, which will be described subsequently in greater detail, is to provide a new and improved sanitary pest control system and method which has all the advantages of the prior art and none of the disadvantages.

To attain this, the present invention essentially comprises a housing having a generally rectangular configuration. The housing has a top wall, a bottom wall, a forward wall, an openable vented rearward wall, two long vented side walls and a hollow interior. The top wall has a generally U-shaped handle affixed thereto. The forward wall has an outlet aperture therethrough. A circular flange coupling member is disposed within the outlet aperture. The bottom wall has four legs disposed in four corners thereof. The two side walls have lateral grooves formed on an interior surface thereof for slidably receiving a supplemental base therebetween. An air conditioning system is disposed within the hollow interior of the housing. The air conditioning system is positioned on the supplemental base. The air conditioning system includes an evaporator disposed adjacent to the forward wall of the housing. A motor is positioned rearwardly of the evaporator. The motor has an axial rod extending rearwardly therefrom. A forward fan is rotatably coupled with the axial rod adjacent to the motor. An interior housing is positioned rearwardly of the motor. The interior housing receives the axial rod therethrough. The interior housing has a compressor and a condenser disposed therein. A flow tube extends between the interior housing and the evaporator to allow flow of refrigerant from the compressor and the condenser to the evaporator. A rearward fan is rotatably coupled with a distal end of the axial rod and disposed between the interior housing and the rearward wall of the housing. The air conditioning system has a power cord extending outwardly of the housing for coupling with an electrical outlet. A power switch is disposed within the top wall of the housing. The power switch is electrically coupled with the air conditioning system for selective activation or deactivation thereof. A temperature control panel is disposed within the forward wall of the housing and operatively coupled with the power switch and the air conditioning system for adjusting air temperature. An air release nozzle comprises an elongated tube having a forward end formed with a slotted opening. The tube has an open rearward end with a hose extending outwardly therefrom. A free end of the hose couples with the circular flanged coupling member in the outlet aperture of the housing. The air release nozzle includes a flow control switch pivotally coupled with the elongated tube. The flow control switch has a generally L-shape configuration. A lower segment of the flow control switch extends within the elongated tube to preclude passage of air therethrough in a closed orientation. An upper segment of the flow control switch is pivotally coupled with the elongated tube and secured to the lower segment. A spring extends between a free end of the upper segment to bias the upper segment outwardly so as to position the lower segment within the elongated tube in the closed orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sanitary pest control system which has all the advantages of the prior art portable air conditioning units and none of the disadvantages.

It is another object of the present invention to provide a new and improved sanitary pest control system which may be easily and efficiently manufactured and marketed.

It is a further object of the present invention to provide a new and improved sanitary pest control system which is of durable and reliable construction.

An even further object of the present invention is to provide a new and improved sanitary pest control system which is susceptible of a low cost of manufacture with regard to both materials and labor, and which accordingly is then susceptible of low prices of sale to the consuming public, thereby making such a sanitary pest control system economically available to the buying public.

Even still another object of the present invention is to provide a new and improved sanitary pest control system for flushing out and killing insects and household pests by freezing them.

Lastly, it is an object of the present invention to provide a new and improved sanitary pest control system including a housing. An air conditioning system is disposed within a hollow interior of the housing. The air conditioning system has a power cord extending outwardly of the housing for coupling with an electrical outlet. A power switch is disposed within a top wall of the housing. The power switch is electrically coupled with the air conditioning system for selective activation or deactivation thereof. A temperature control panel is disposed within a forward wall of the housing and operatively coupled with the power switch and the air conditioning system for adjusting air temperature. An air release nozzle couples with respect to the housing and is in communication with the air conditioning system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the sanitary pest control system constructed in accordance with the principles of the present invention.

FIG. 2 is a front elevation view of the present invention.

FIG. 3 is a side elevation view of the present invention.

FIG. 4 is a cross-sectional view as taken along line 4—4 of FIG. 2.

FIG. 5 is a side view of the dispensing nozzle of the present invention.

FIG. 6 is a rear elevation view of the present invention illustrating the access door thereof.

The same reference numerals refer to the same parts through the various figures.

DESCRIPTION OF THE PREFERRED EMBODIMENT

With reference now to the drawings, and in particular, to FIGS. 1 through 6 thereof, the preferred embodiment of the new and improved sanitary pest control system embodying the principles and concepts of the present invention and generally designated by the reference number 10 will be described. Note FIG. 1.

Specifically, it will be noted in the various Figures that the device relates to a sanitary pest control system for flushing out and killing insects and household pests by freezing them. In its broadest context, the device consists of a housing, an air conditioning system, a power switch, a temperature control panel and an air release nozzle. Such components are individually configured and correlated with respect to each other so as to attain the desired objective.

The housing 12 has a generally rectangular configuration. The housing 12 has a top wall 14, a bottom wall 16, a forward wall 18, an openable vented rearward wall 20, two long vented side walls 22 and a hollow interior 24. The rearward wall 20 and the two side walls 22 are provided with laterally disposed flared vents. The top wall 14 adjoins the forward and rear walls as well as the two side walls with rounded edges 26. Note FIG. 2. The top wall 14 has a generally U-shaped handle 28 affixed thereto. The forward wall 18 has an outlet aperture 30 therethrough. A circular flange coupling member 32 is disposed within the outlet aperture 30. Note FIGS. 2–4. The bottom wall 16 has four legs 34 disposed in four corners thereof so as to elevate the housing 12 above a recipient surface. The two side walls have lateral grooves 36 formed on an interior surface thereof for slidably receiving a supplemental base 38 therebetween. Note FIG. 4.

The air conditioning system 40 is disposed within the hollow interior of the housing 12. Note FIGS. 4 and 6. The air conditioning system 40 is positioned on the supplemental base 38. The air conditioning system 40 includes an evaporator 42 disposed adjacent to the forward wall 18 of the housing 12. A motor 44 is positioned rearwardly of the evaporator. The motor 44 has an axial rod 46 extending rearwardly therefrom. A forward fan 48 is rotatably coupled with the axial rod 46 adjacent to the motor 44. An interior housing 50 is positioned rearwardly of the motor 44. The interior housing 50 receives the axial rod 46 therethrough. The interior housing 50 has a compressor and a condenser disposed therein (not shown). A flow tube 52 extends between the interior housing 50 and the evaporator 42 to allow flow of refrigerant from the compressor and the condenser to the evaporator 42. A rearward fan 54 is rotatably coupled with a distal end of the axial rod 46 and disposed between the interior housing 50 and the rearward wall 20 of the housing 12. The air conditioning system 40 has a power cord 56 extending outwardly of the housing 12 for coupling with an electrical outlet 58. Note FIG. 1.

The power switch 60 is disposed within the top wall 14 of the housing 12. The power switch 60 is electrically coupled with the air conditioning system 40 for selective activation or deactivation thereof. When the power switch 60 is turned to the "on" position, the air conditioning system 40 is activated thus providing a flow of refrigerant between the evaporator 42 and the compressor and condenser to generate the flow of cool air to be dispensed out of the housing 12 through the outlet aperture 30.

The temperature control panel 62 is disposed within the forward wall 18 of the housing 12 and is operatively coupled with the power switch 60 and the air conditioning system 40 for adjusting air temperature. The control panel 62 is an adjustable knob used to adjust the system 10 to the proper temperature desired, usually 0–15 degrees Fahrenheit.

The air release nozzle 64, as best illustrated in FIG. 5, comprises an elongated tube 66 having a forward end formed with a slotted opening 68. The tube 66 has an open rearward end with a hose 70 extending outwardly therefrom. A free end of the hose 70 couples with the circular flanged coupling member 32 in the outlet aperture 30 of the housing 12. The elongated tube 66 is further provided with a grip handle 72 to provide for a comfortable handling of the nozzle. The air release nozzle 64 includes a flow control switch 74 pivotally coupled with the elongated tube 66. The flow control switch 74 has a generally L-shape configuration. A lower segment 76 of the flow control switch 74 extends within the elongated tube 66 to preclude passage of air therethrough in a closed orientation. An upper segment 78 of the flow control switch 74 is pivotally coupled with the elongated tube 66 and secured to the lower segment 76. A spring 80 extends between a free end of the upper segment 78 and the elongated tube 66 so as to bias the upper segment 78 outwardly so as to position the lower segment 76 within the elongated tube 66 in the closed orientation. A thumb pad 82 is further provided on the upper segment 78 to allow for the easy manipulation into the open orientation wherein the upper segment 78 is pressed against the elongated tube 66 to remove the lower segment 76 from within the tube 66 and allow the free flow of cooled air therethrough to be dispensed through the slotted opening 68. The slotted aperture 68 is directed towards a desired area for a period of three to five minutes in order to kill any insects or bugs and their eggs by freezing them.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the united states is as follows:

1. A sanitary pest control system for flushing out and killing insects and household pests by freezing them comprising, in combination:

a housing having a generally rectangular configuration, the housing having a top wall, a bottom wall, a forward wall, an openable vented rearward wall, two long vented side walls and a hollow interior, the top wall having a generally U-shaped handle affixed thereto, the forward wall having an outlet aperture therethrough, a circular flange coupling member disposed within the outlet aperture, the bottom wall having four legs disposed in four corners thereof, the two side walls having lateral grooves formed on an interior surface thereof for slidably receiving a supplemental base therebetween;

an air conditioning system disposed within the hollow interior of the housing, the air conditioning system positioned on the supplemental base, the air conditioning system including an evaporator disposed adjacent to the forward wall of the housing, a motor positioned rearwardly of the evaporator, the motor having an axial rod extending rearwardly therefrom, a forward fan rotatably coupled with the axial rod adjacent to the motor, an interior housing positioned rearwardly of the motor, the interior housing receiving the axial rod therethrough, the interior housing having a compressor and a condenser disposed therein, a flow tube extends between the interior housing and the evaporator to allow flow of refrigerant from the compressor and the condenser to the evaporator, a rearward fan rotatably coupled with a distal end of the axial rod disposed between the interior housing and the rearward wall of the housing, the air conditioning system having a power cord extending outwardly of the housing for coupling with an electrical outlet;

a power switch disposed within the top wall of the housing, the power switch being electrically coupled with the air conditioning system for selective activation or deactivation thereof;

a temperature control panel disposed within the forward wall of the housing and operatively coupled with the power switch and the air conditioning system for adjusting air temperature; and an air release nozzle comprising an elongated tube having a forward end formed with a slotted opening, the tube having an open rearward end with a hose extending outwardly therefrom, a free end of the hose coupling with the circular flanged coupling member in the outlet aperture of the housing, the air release nozzle including a flow control switch pivotally coupled with the elongated tube, the flow control switch having a generally L-shaped configuration, a lower segment of the flow control switch extends within the elongated tube to preclude passage of air therethrough in a closed orientation, an upper segment of the flow control switch pivotally coupled with the elongated tube and secured to the lower segment, a spring extends between a free end of the upper segment and the elongated tube to bias the upper segment outwardly so as to position the lower segment within the elongated tube in the closed orientation.

2. A sanitary pest control system comprising:

a housing;

an air conditioning system disposed within a hollow interior of the housing, the air conditioning system having a power cord extending outwardly of the housing for coupling with an electrical outlet;

a power switch disposed within a top wall of the housing, the power switch being electrically coupled with the air conditioning system for selective activation or deactivation thereof;

a temperature control panel disposed within a forward wall of the housing and operatively coupled with the power switch and the air conditioning system for adjusting air temperature; and an air release nozzle coupling with respect to the housing and in communication with the air conditioning system;

wherein the forward wall has an outlet aperture therethrough, a circular flange coupling member disposed within the outlet aperture for coupling with respect to the air release nozzle, wherein the housing has an openable vented rearward wall.

3. The system as set forth in claim 2 wherein two side walls of the housing have lateral grooves formed on an interior surface thereof for slidably receiving a supplemental base therebetween, the supplemental base receiving the air conditioning system thereon.

4. The system as set forth in claim 2 wherein the air conditioning system includes an evaporator disposed adjacent to the forward wall of the housing, a motor positioned rearwardly of the evaporator, the motor having an axial rod extending rearwardly therefrom, a forward fan rotatably coupled with the axial rod adjacent to the motor, an interior housing positioned rearwardly of the motor, the interior housing receiving the axial rod therethrough, the interior housing having a compressor and a condenser disposed therein, a flow tube extends between the interior housing and the evaporator to allow flow of refrigerant from the compressor and the condenser to the evaporator.

5. The system as set forth in claim 4 and further including a rearward fan rotatably coupled with a distal end of the axial rod disposed between the interior housing and a rearward wall of the housing.

6. The system as set forth in claim 2 wherein the air release nozzle comprises an elongated tube having a forward end formed with a slotted opening, the tube having an open rearward end with a hose extending outwardly therefrom, a free end of the hose coupling with the circular flanged coupling member in the outlet aperture of the housing.

7. The system as set forth in claim 6 wherein the air release nozzle includes a flow control switch pivotally coupled with the elongated tube.

8. The system as set forth in claim 7 wherein the flow control switch has a generally L-shaped configuration, a lower segment of the flow control switch extends within the elongated tube to preclude passage of air therethrough in a closed orientation, an upper segment of the flow control switch pivotally coupled with the elongated tube and secured to the lower segment, a spring extends between a free end of the upper segment and the elongated tube to bias the upper segment outwardly so as to position the lower segment within the elongated tube in the closed orientation.

\* \* \* \* \*